(12) United States Patent
Bradley et al.

(10) Patent No.: US 6,857,136 B1
(45) Date of Patent: Feb. 22, 2005

(54) INFLATABLE HEAD AND NECK SUPPORT COLLAR

(75) Inventors: Gary Furman Bradley, Hendersonville, NC (US); Carroll Leon Rhodes, Hendersonville, NC (US)

(73) Assignee: Simula, Inc., Tempe, AZ (US)

( * ) Notice: Subject to any disclaimer, the term of this patent is extended or adjusted under 35 U.S.C. 154(b) by 12 days.

(21) Appl. No.: 10/256,016

(22) Filed: Sep. 27, 2002

(51) Int. Cl.⁷ .............................................. A41D 13/00
(52) U.S. Cl. ........................... 2/468; 2/102; 2/DIG. 3; 441/88; 441/90; 441/106; 441/123
(58) Field of Search ............................ 2/463, 411, 413, 2/DIG. 3, 102, 6.1, 6.2; 297/393; 280/733, 290; 244/122 AG; 441/88, 90, 106, 108, 123; 128/DIG. 23

(56) References Cited

U.S. PATENT DOCUMENTS

| | | | | | |
|---|---|---|---|---|---|
| 3,905,615 | A | * | 9/1975 | Schulman | 280/730.1 |
| 3,948,541 | A | * | 4/1976 | Schulman | 280/733 |
| 4,274,161 | A | * | 6/1981 | Littler | 2/413 |
| 4,297,758 | A | * | 11/1981 | Moran | 441/123 |
| 4,561,853 | A | * | 12/1985 | Faulconer et al. | 441/106 |
| 5,037,341 | A | * | 8/1991 | Howard | 441/89 |
| 5,133,084 | A | * | 7/1992 | Martin | 2/468 |
| 5,282,648 | A | * | 2/1994 | Peterson | 280/733 |
| 5,313,670 | A | * | 5/1994 | Archer, III | 2/411 |
| 5,362,098 | A | * | 11/1994 | Guill | 280/733 |
| 5,402,535 | A | * | 4/1995 | Green | 2/468 |
| 5,692,933 | A | * | 12/1997 | Bradley et al. | 441/106 |
| 5,746,633 | A | * | 5/1998 | Jeffrey | 441/123 |
| 5,937,443 | A | * | 8/1999 | Kageyama et al. | 2/69 |
| 6,032,299 | A | * | 3/2000 | Welsh | 2/456 |
| 6,237,945 | B1 | * | 5/2001 | Aboud et al. | 280/733 |
| 6,296,204 | B1 | | 10/2001 | Lewis et al. | |
| 6,346,022 | B1 | * | 2/2002 | Swanby et al. | 441/106 |
| 6,422,513 | B1 | | 7/2002 | Lewis et al. | |
| 6,589,088 | B1 | * | 7/2003 | Maness | 441/106 |
| 6,659,689 | B1 | * | 12/2003 | Courtney et al. | 405/186 |
| 2002/0094735 | A1 | * | 7/2002 | Lariviere | 441/123 |

FOREIGN PATENT DOCUMENTS

| | | | | | |
|---|---|---|---|---|---|
| GB | 2046182 | A | * | 11/1980 | B63C/9/12 |
| GB | 2082979 | A | * | 3/1982 | B63C/9/08 |
| GB | 2197627 | A | * | 5/1988 | B63C/9/16 |

\* cited by examiner

*Primary Examiner*—Rodney M. Lindsey
(74) *Attorney, Agent, or Firm*—Shaw Pittman LLP

(57) ABSTRACT

A support collar having a bladder and a shell. The bladder is adapted to be inflated by a fluid. The shell is adapted to be attached to a harness. When inflated, the bladder is shaped by the shell to form an air chamber. The air chamber is characterized by a cross-section having a center of gravity and a dimension through the center of gravity. The dimension is larger at an open end than at the close end.

38 Claims, 20 Drawing Sheets

INFLATABLE HEAD AND NECK SUPPORT COLLAR

This invention was made with Government support under Martin-Baker Subcontract No. MBA/f33657-00-C-0046/109/SC04, which was part of Prime Contract No. F33657-00-C-0046 awarded by the Department of the Air Force. The Government has certain rights in the invention.

BACKGROUND

1. Field of the Invention

The present invention relates generally to transportation safety devices and, more particularly, to an inflatable safety device for head and neck support.

2. Background of the Invention

During a high speed ejection, an aviator is exposed to the possibility of head and neck injuries due to several different conditions. For example, the aviator's head can be violently forced out of position by forces generated by windblast, drogue parachute inflation, ejection seat alignment with the wind stream, or recovery parachute inflation. In addition to injuries caused by these forces, the aviator's head being out of position could set the stage for further injury during the riser slap, which occurs when the main parachute risers deploy.

U.S. Pat. Nos. 6,296,204 and 6,422,513 (both issued to Lewis et al.) disclose inflatable systems for flight crew members. The '204 patent discloses a flight helmet that includes an inflatable unit. The '513 patent discloses a flight vest that includes an inflatable unit.

SUMMARY OF THE INVENTION

The present invention is an inflatable safety device A preferred embodiment of the invention is a head and neck support collar that includes a bladder assembly and a cover assembly. The bladder assembly includes a bladder, a shell, and one or more straps. The bladder is adapted to be inflated by a fluid to form an air chamber. The shell is design to protect the bladder. The straps attach the shell to a harness, which is worn by a user of the invention. One of the bladder and the shell is made of a nonporous material, and the other is made of a porous material. Preferably, the bladder is made of a nonporous material and the shell is made of a porous material. The cover assembly protects the shell during a normal or stowed condition. The cover assembly has grommet sets through which the straps can be fed to attach the bladder assembly to the harness. Preferably, the cover assembly further includes a zipper that facilitates placement of the bladder assembly within the cover assembly. The zipper is engaged during the normal condition. When the bladder is inflated during an inflated or deployed condition, the zipper is disengaged or ripped open.

In another embodiment of the invention, the shell is adapted to shape the air chamber of the bladder into two lobes. Each of the two lobes are characterized by a close end and an open end. A fastener is used to hold the open ends together. The fastener is preferably a tether that is strong enough to hold the open ends together during the inflated condition. Each of the two lobes is characterized by a cross-section. The cross-section preferably takes the shape of a circle or an ellipse. The cross-section is characterized by a length dimension through the center of gravity of the cross-section. Preferably, the length dimension varies from the open end to the close end. Preferably, the length dimension decreases from the open end to the close end.

In still another embodiment, the present invention provides a floatation device that includes, in addition to the bladder assembly and the cover assembly described above, a harness, and a floatation member. Preferably, the bladder assembly is adapted to be attached to the harness.

The present invention further provides methods for making the inflatable support collar and the floatation device.

DETAILED DESCRIPTION OF THE INVENTION

The invention is an inflatable safety device that is designed to protect its user's (the wearer's) head and neck. It may be adapted for use in several fields. For example, the invention may be adapted as a head/neck restraint for aviators. In addition, the invention may be adapted for use by racecar drivers.

A preferred embodiment of the invention is a support collar that includes a bladder assembly and a cover assembly. The bladder assembly includes a bladder, a shell, and one or more straps that are adapted to attach the bladder assembly to a harness or vest worn by a user of the invention. The cover assembly contains the bladder assembly, and it includes grommet sets through which the straps are fed. Structural connection of the support collar to the harness at the bladder assembly, rather than at the cover assembly, provides several advantages. First, the bladder assembly stays at the position as designed, i.e., around the neck area of the user, during inflation because the bladder assembly is directly attached to the harness worn by the user. Second, the bladder assembly is not be affected by a destruction of the cover assembly.

The bladder is a sealed unit that is designed to inflate to form an air chamber. The pressure within the bladder is preferably maintained at a constant pressure for a specified amount of time. The pressure and the duration for inflation can be regulated by input and exhaust valves. The bladder shell is designed to confine the bladder while maintaining the desired configuration. The bladder, when inflated, has a cross-section that is designed to offer the maximum protection to the user, regardless of the use's head or neck size. The cover assembly has a protective cover in which the bladder assembly is packaged.

Figure 1:
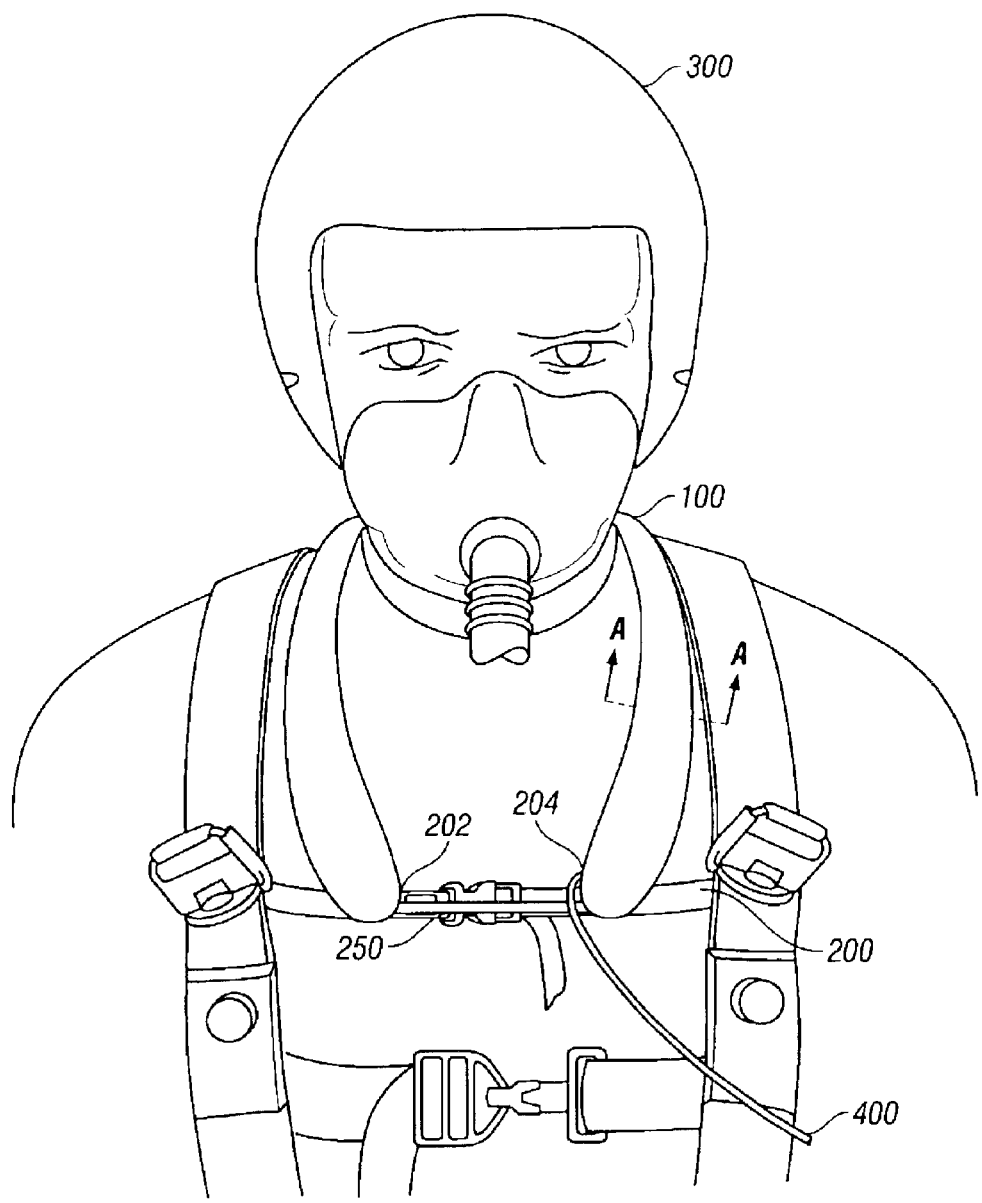
FIG. 1 is a schematic diagram of a first preferred embodiment of the invention showing a front view of a support collar attached to a harness during a normal condition.
Figure 2:
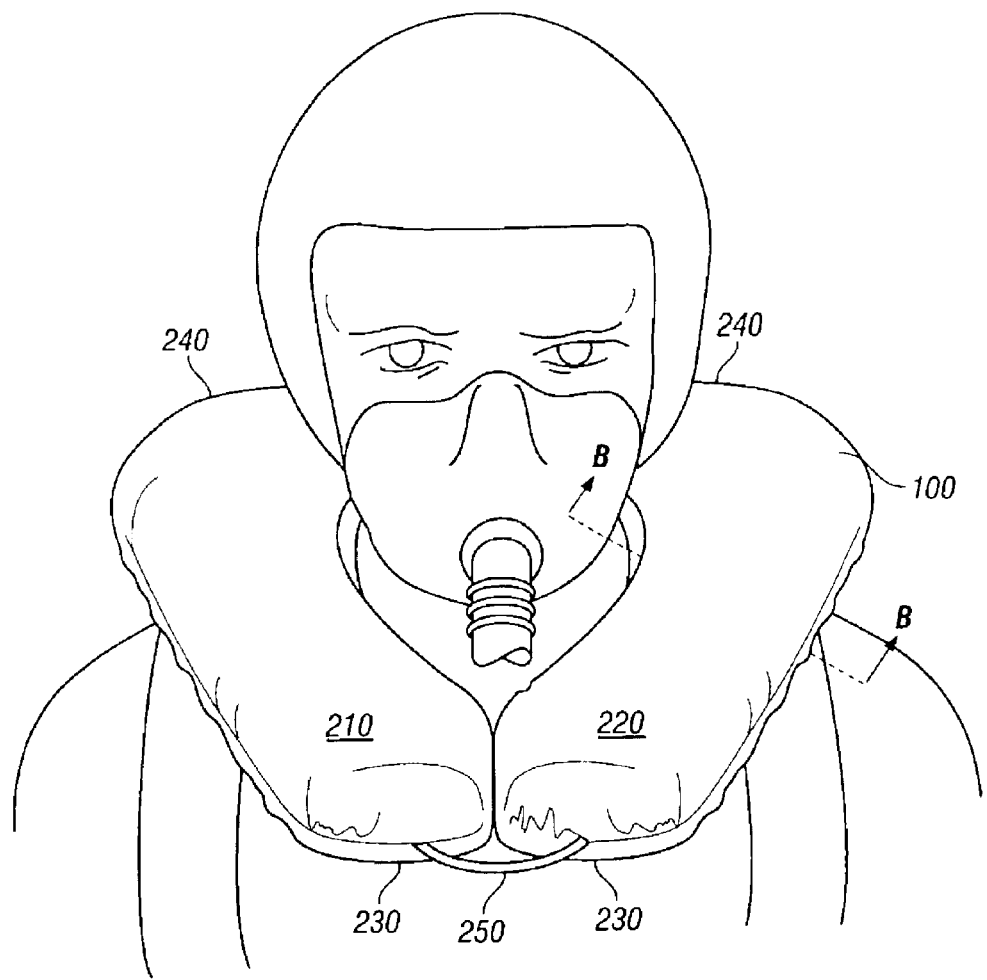
FIG. 2 is a schematic diagram of the first preferred embodiment of the invention showing a front view of the support collar during an inflated condition.
Figure 3:
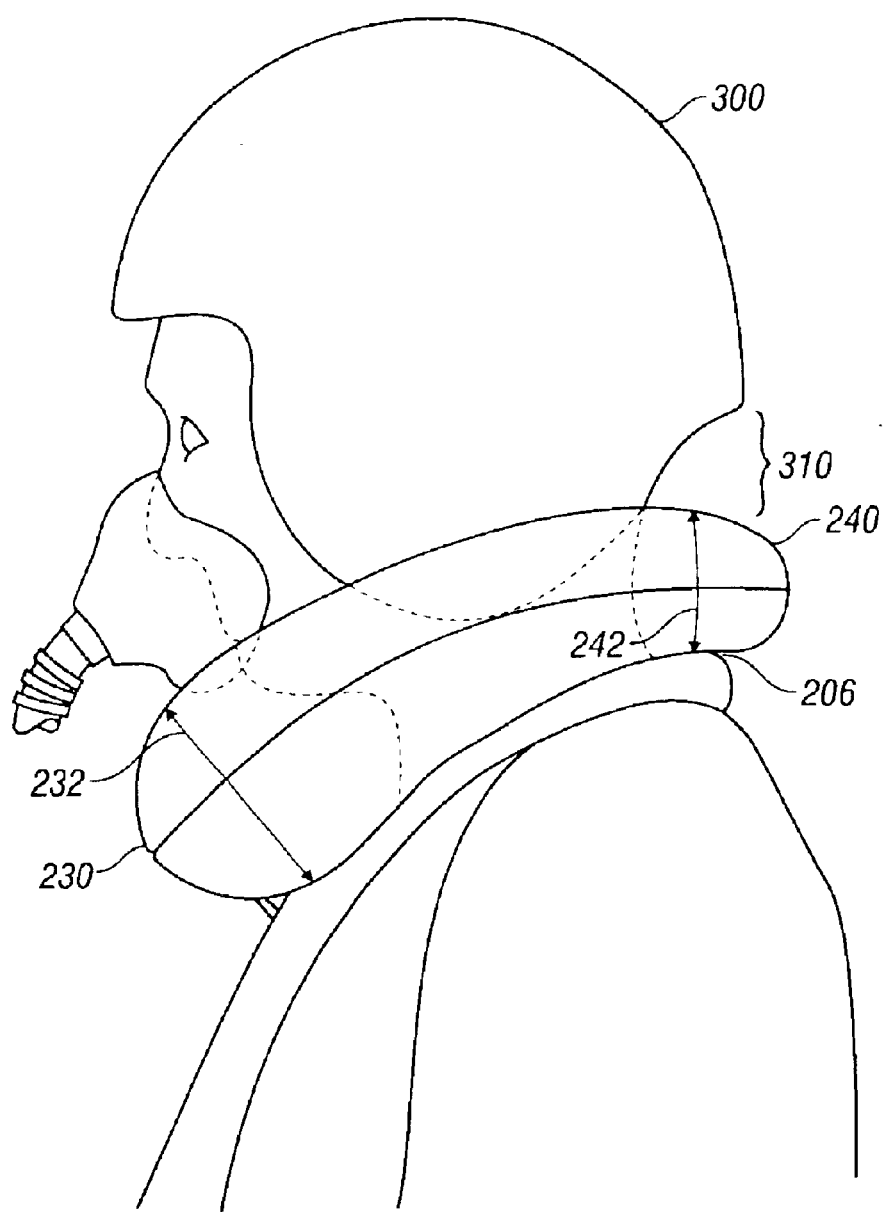
FIG. 3 is a schematic diagram of the first preferred embodiment of the invention showing a side view of the support collar during the inflated condition.

FIGS. 1, 2, 3, 4, 5, and 6 are schematic diagrams showing different views of a first preferred embodiment of the present invention. As shown in FIG. 1, support collar 100 is attached to harness 200, which is worn by user 300. For example, support collar 100 may be attached to harness 200 at locations 202 and 204. Support collar 100 may further be attached to harness 200 at location 206, which is shown in FIG. 3. Support collar 100 is shown in FIG. 1 during a normal condition. The normal condition means that the support collar has not been inflated by an inflation fluid.

As shown in FIG. 1, support collar 100 is in communication with conduit 400. In one embodiment, conduit 400 is a tube that supplies an inflation fluid from an inflator that is external to support collar 100. In a different embodiment, conduit 400 is a pair of electrical wires that supplies an electrical signal to activate an inflator that is located within an air chamber of support collar 100. In any embodiment of the invention, the inflator can either be a hot-air inflator or a cold-air inflator.

Support 100 is shown in FIG. 2 in its inflated condition. When inflated, support collar 100 has left lobe 210 and right lobe 220. Each of lobes 210 and 220 has open end 230 and close end 240. As shown in FIG. 3, diameter 232 of open end 230 is larger than diameter 242 of close end 240. This configuration reduces the possibility of an injury to the head of user 300. For example, space 310 between close end 240 and the head of user 300 provides a buffer zone that minimizes the possibility of an injury during parachute riser deployment. The reduction in diameter 242 of close end 240 prevents loading of the neck through the inflated bladder from a seat back structure or seat head rest structure, and the enlargement in diameter between diameter 242 of close end 240 and diameter 232 of open end 230 creates the optimum shape to support the head of user 300 by reacting against the head or helmet worn thereon. Open end 230 and close end 240 are preferably attached to each other by mechanical device 250. Mechanical device 250 can be, for example, a tether strap.

Figure 4:
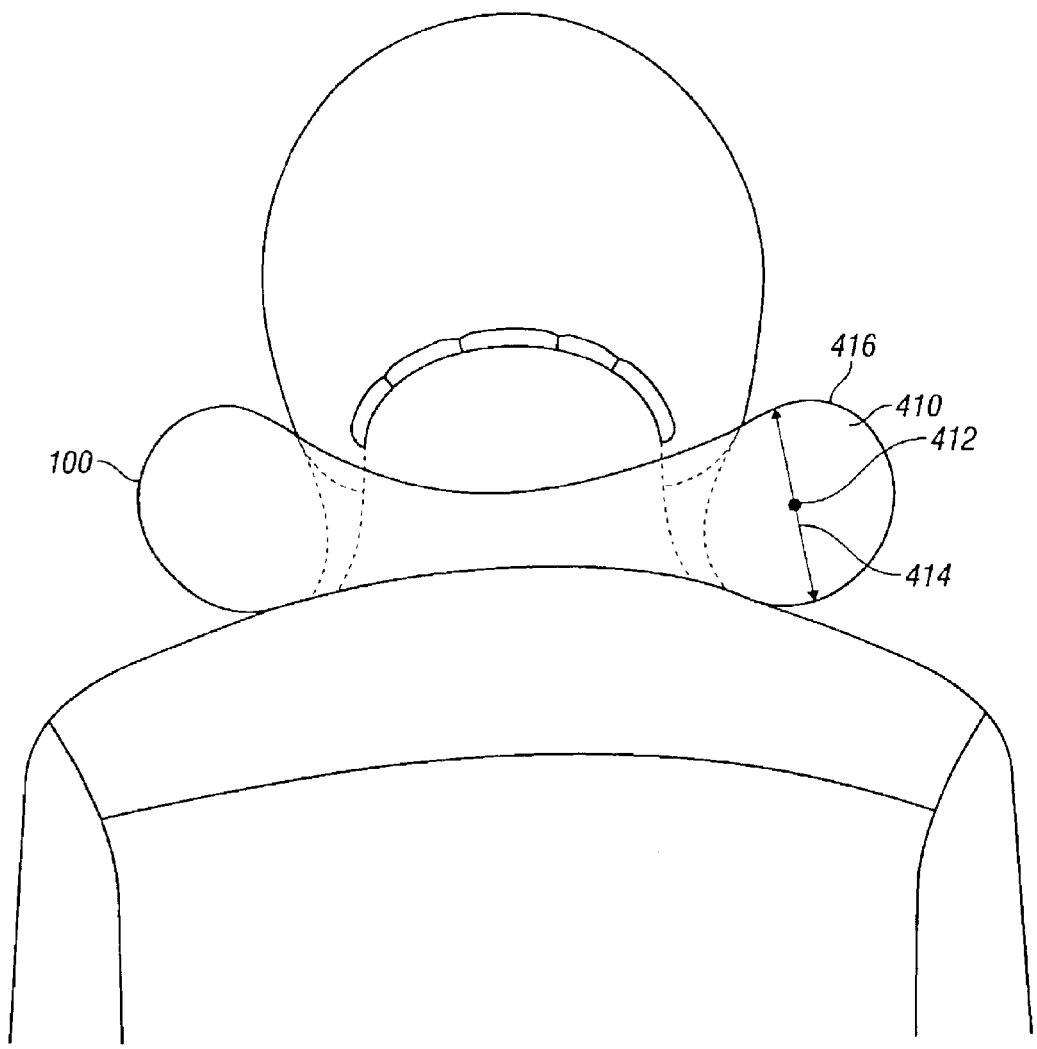
FIG. 4 is a schematic diagram of the first preferred embodiment of the invention showing a back view of the support collar during the inflated condition.

As shown in FIG. 4, in its inflated condition support collar 100 exhibits cross-section 410, which has center of gravity 412 and dimension 414. Dimension 414 is characterized by a straight line that runs through center of gravity 412 and ends at circumference 416 of cross-section 410. If cross-section 410 were a circle, then center of gravity 412 would be the center of the circle, and dimension 414 would be the diameter of the circle. Dimension 414 can vary in size along the length of each of lobes 210 and 220. Preferably, dimension 414 is longer at open end 230 and shorter at close end 240.

Figure 5:
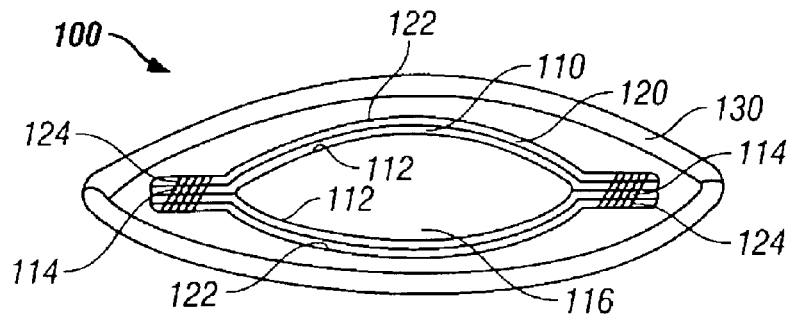
FIG. 5 is a schematic diagram of a cross-sectional view along line A—A shown in FIG. 1 during the normal condition.

FIG. 5 is a schematic diagram of a cross-sectional view along line A—A shown in FIG. 1 during the normal condition. Support collar 100 includes bladder 110, bladder shell 120, and cover 130. Cover 130 encloses shell 120, which in turn encloses bladder 110.

Bladder 110 is preferably constructed from two pieces of bladder panels 112. Bladder panels 112 are preferably identical in shape and size. Bladder panels 112 are preferably made of a lightweight non-porous material. Bladder panels 112 are preferably fused together along perimeters 114. For example, bladder panels 112 can be RF (radio frequency) sealed along perimeters 114.

Figure 6:
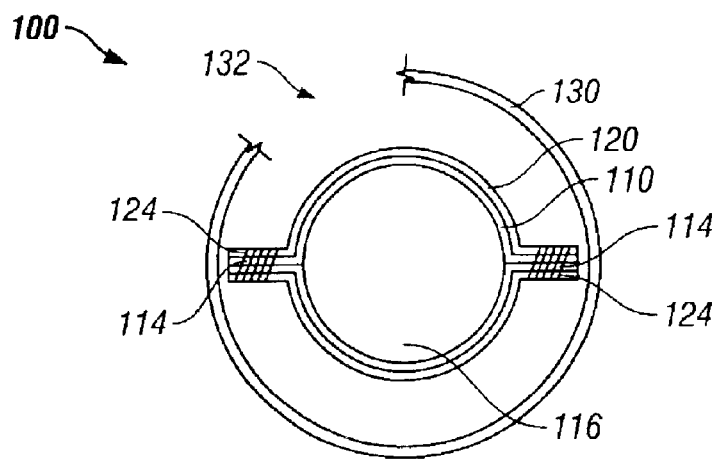
FIG. 6 is a schematic diagram of a cross-sectional view along line B—B shown in FIG. 2 during the inflated condition.
Figure 7:
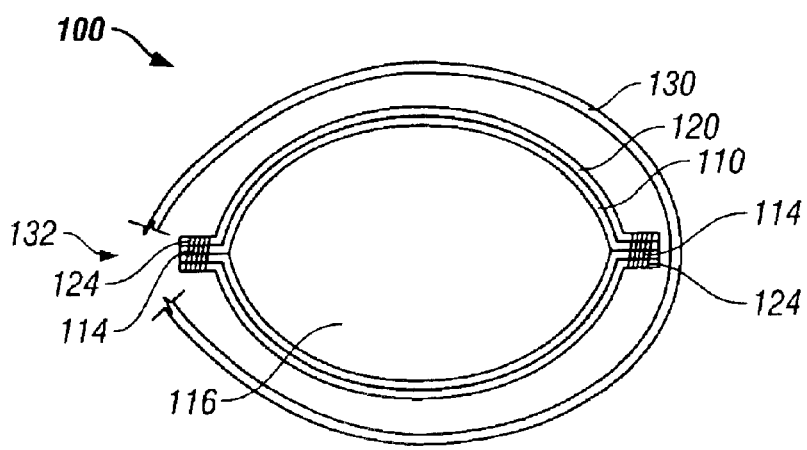
FIG. 7 is a schematic diagram of another cross-section view along line B—B shown in FIG. 2 during the inflated condition.

When inflated, bladder panels 112 forms air chamber 116 as shown in FIG. 6. As shown in FIG. 6, air chamber 116 has a circular cross-section. Air chamber 116 may have an alternative cross-section, such as an elliptical cross-section shown in FIG. 7. When air chamber 116 is partially or fully inflated, cover 130 is ripped open along location 132. Location 132 can include a zipper as described in greater details below.

Bladder 110 is incapable of withstanding the pressure in air chamber 116 during the inflated condition. Thus, bladder 110 is preferably assembled within and physically constrained by shell 120. Shell 120 is preferably constructed from two pieces of shell panels 122. Shell panels 122 are preferably made of a lightweight, porous material. Shell panels 122 are designed to shape and restrict the expansion of bladder 110. Shell panels 122 are positioned one on either side of bladder 110. Shell panels 122 are preferably RF sealed together around bladder seal perimeter 124. As explained in greater details below, bladder and shell panels 112 and 122, respectively, in addition to being RF sealed, can be further attached together to provide structural integrity. The attachment can be accomplished, for example, by stitching. Stitching should be done outside of the RF seal areas.

Cover 130 encloses or houses shell 120. Preferably, cover 130 is part of a cover assembly that further includes a zipper at location 132. When disengaged at location 132, the zipper allows the bladder assembly (which includes bladder 110 and shell 120) to be inserted inside the cover assembly. When the zipper is closed, the cover assembly protects the bladder assembly. Cover 130 is preferably constructed from a type of nylon fabric. The zipper can be located anywhere on the cover assembly.

Support collar 100 is worn in a stowed position around the neck of the user. If the user is an aviator, upon ejection seat initiation, bladder 110 is inflated and deployed, restricting the movement of the aviator's head. Preferably, bladder 110 remains pressurized until inflation of the main parachute is achieved. The internal pressure within bladder 110 can preferably be sustained utilizing a series of internal and external gas pressure generators and controlled pressure exhaust valves (not shown). Once the recovery parachute is fully inflated, the pressure in bladder 110 is minimized, allowing for full movement of the aviator's head.

Figure 8:
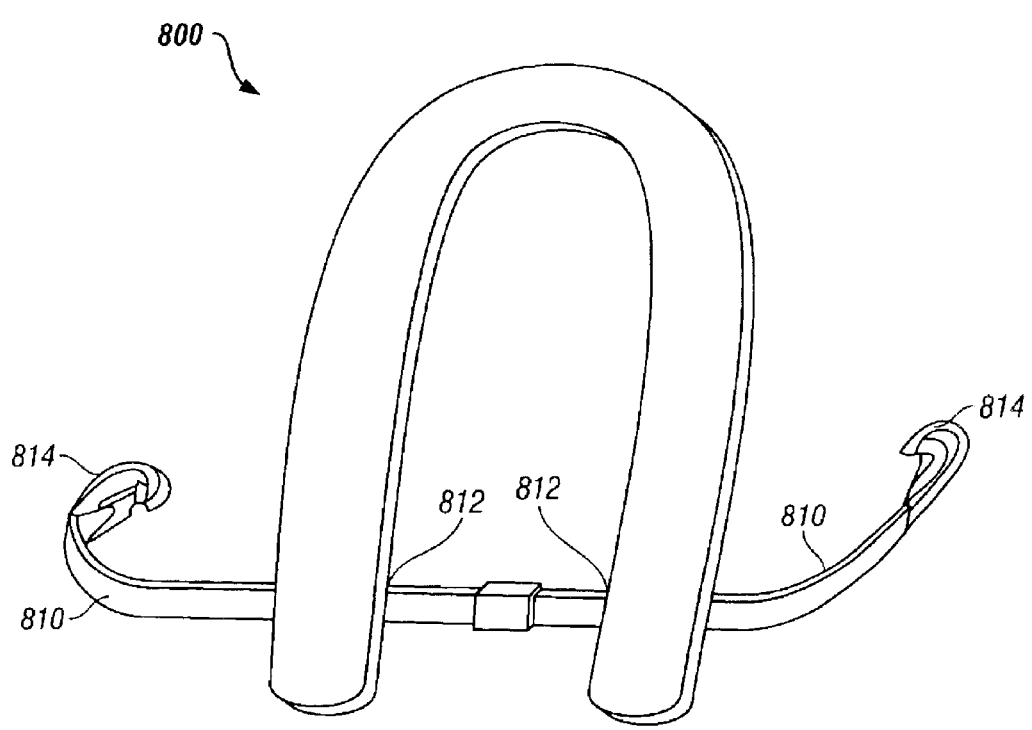
FIG. 8 is a schematic diagram of a second preferred embodiment of the invention showing a perspective view of a support collar having straps adapted to be attached to a harness or a vest of a user.

FIG. 8 is a schematic diagram of a second preferred embodiment of the invention showing a perspective view of support collar 800 having straps 810. Straps 810 are attached to support collar 100 at locations 812. Straps 810 are adapted to be attached to a harness or a vest of a user using one or more fasteners 814. Examples of fasteners 814 can include hooks as shown in FIG. 8. Other fasteners may include buttons or other mechanical devices. Straps 810 are preferably attached directly to a bladder assembly rather than being attached to a cover assembly, of support collar 800 at locations 812.

Figure 9:
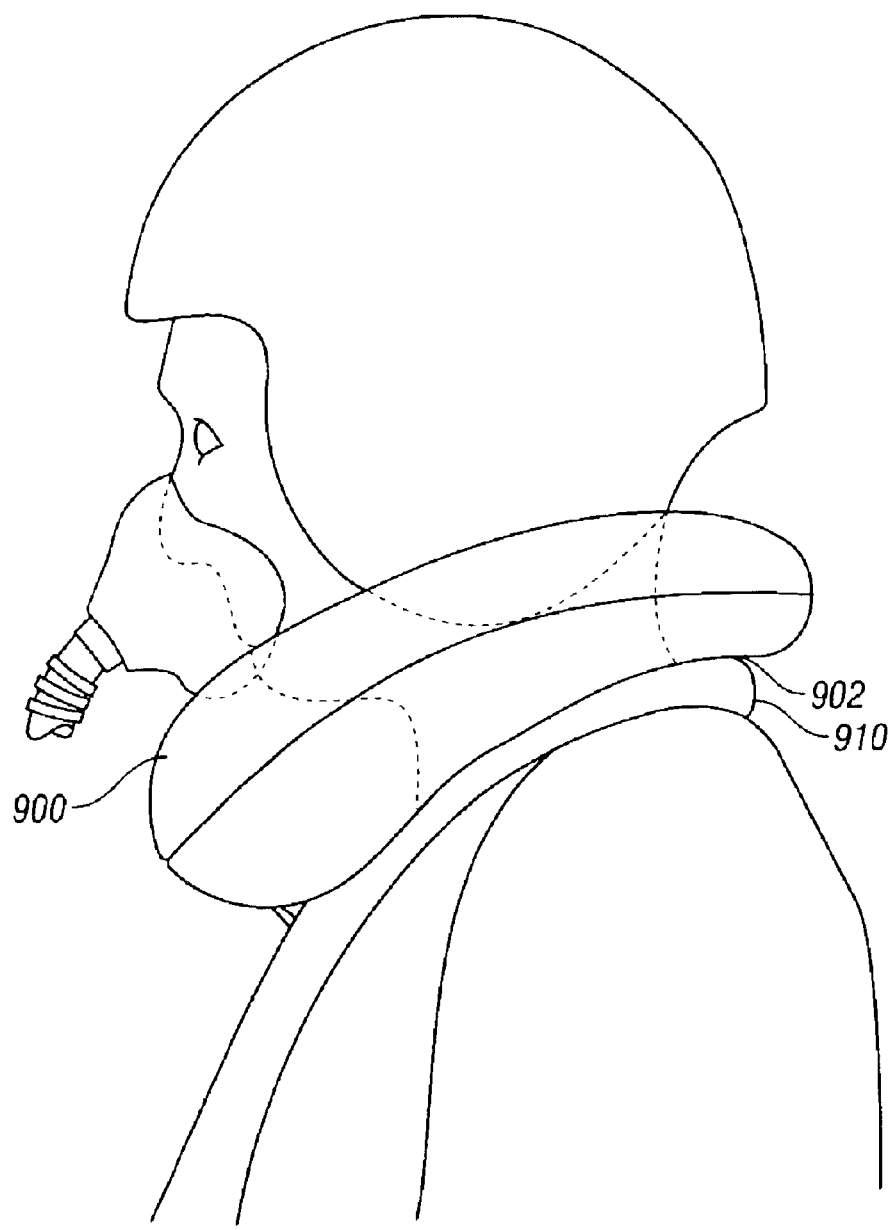
FIG. 9 is a schematic diagram of a third preferred embodiment of the invention showing a side view of the support collar during the inflated condition as attached to a floatation device.
Figure 10:
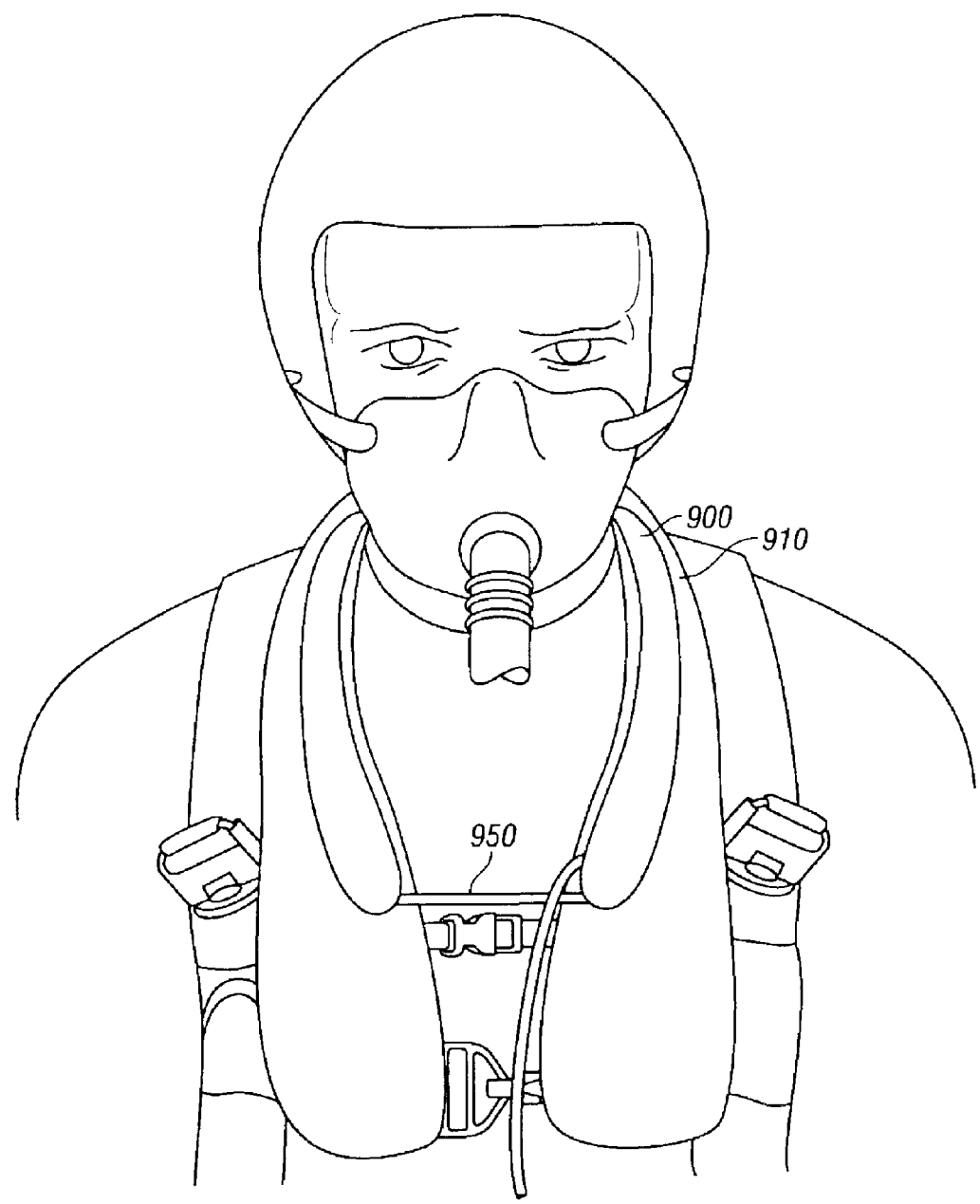
FIG. 10 is a schematic diagram of the third preferred embodiment of the invention showing a front view of the support collar attached to the floatation device during a normal condition.

In a third preferred embodiment shown in FIG. 9, support collar 900 is attached to floatation device 910 at location 902. One key difference between the shape of support collar 900 and that of floatation device 910 is that support collar 900 is much narrower and thinner than floatation device 910. FIG. 10 shows a front view of support collar 900 during a normal condition.

Figure 11:
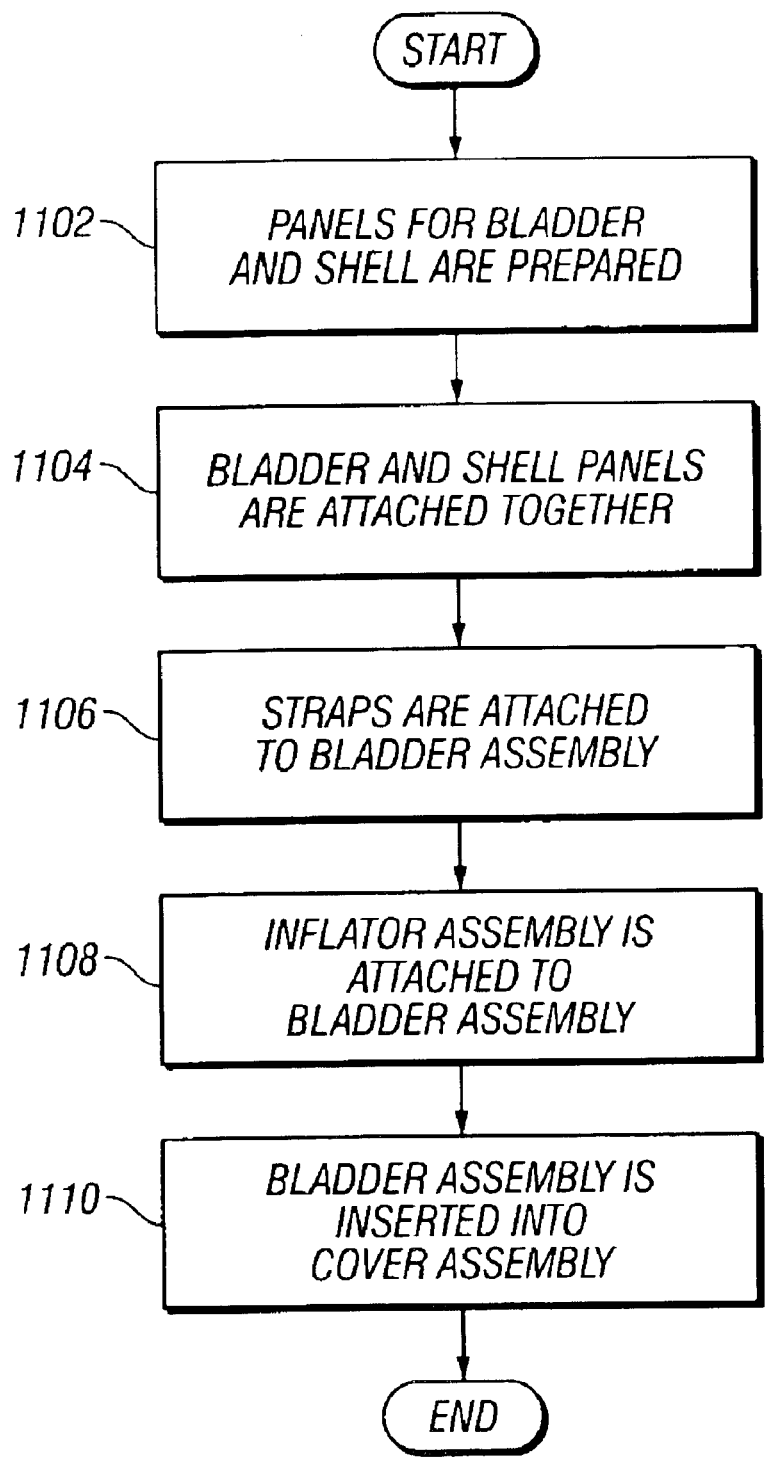
FIG. 11 is a flowchart showing exemplary steps that can be used to make a preferred embodiment of the present invention.
Figure 18:
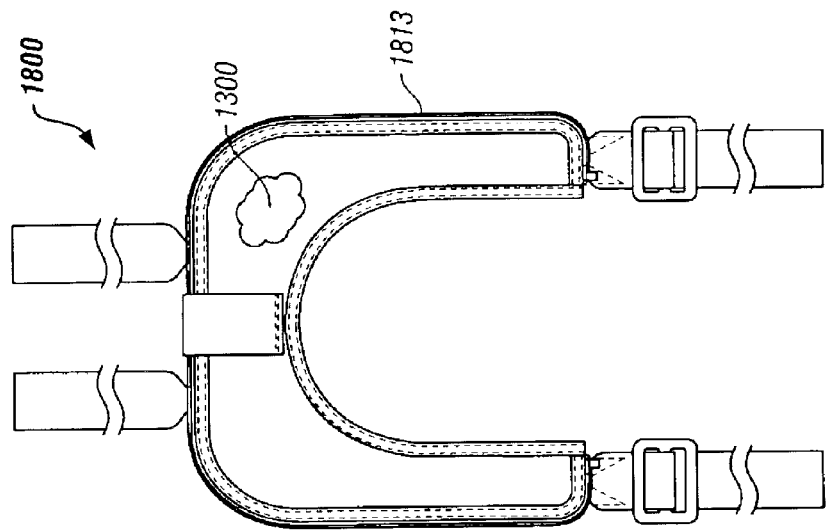
FIG. 18 shows a front view of an exemplary support collar of the present invention.
Figure 19:
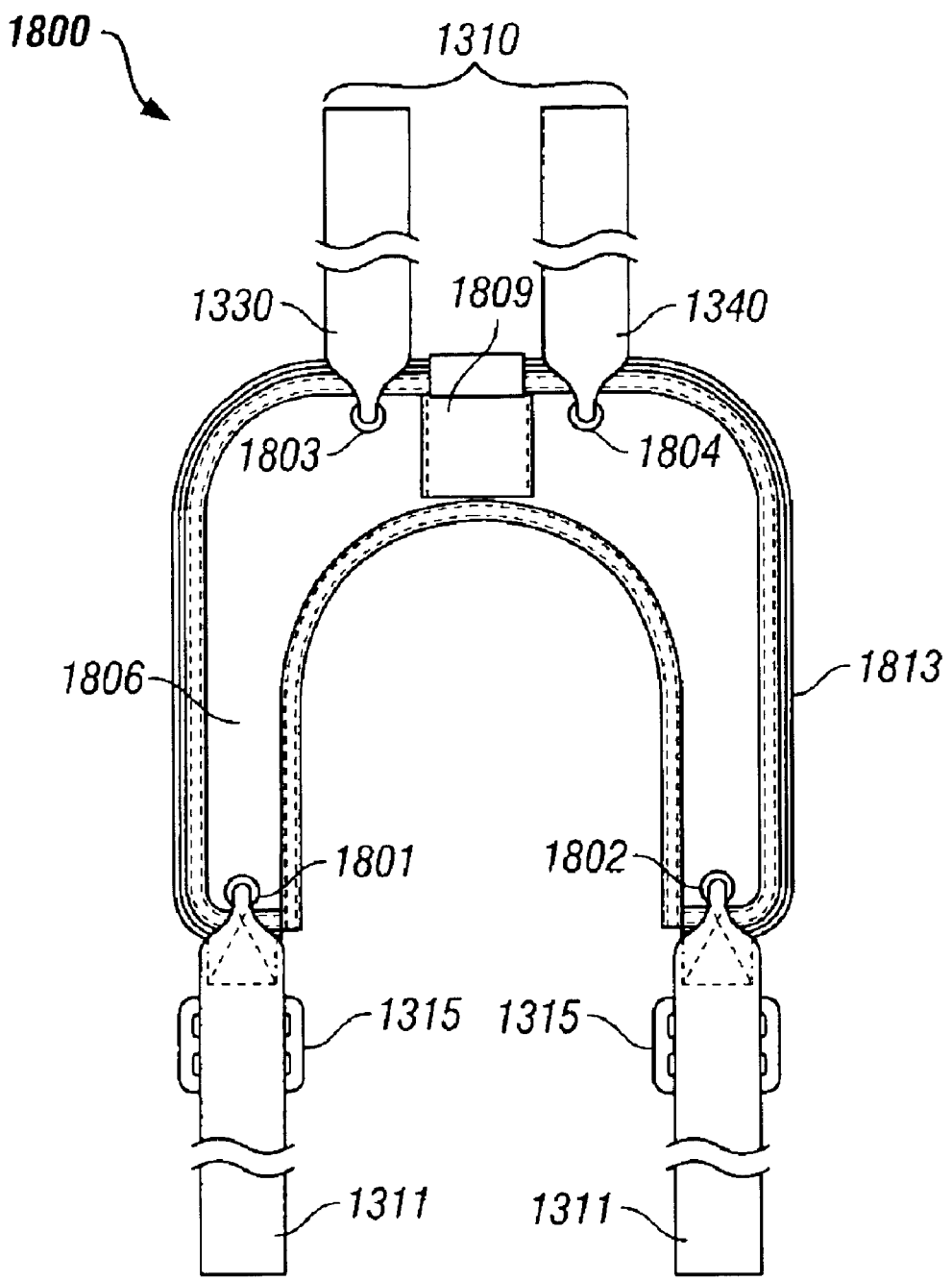
FIG. 19 shows a back view of the exemplary support collar shown in FIG. 18.
Figure 20:
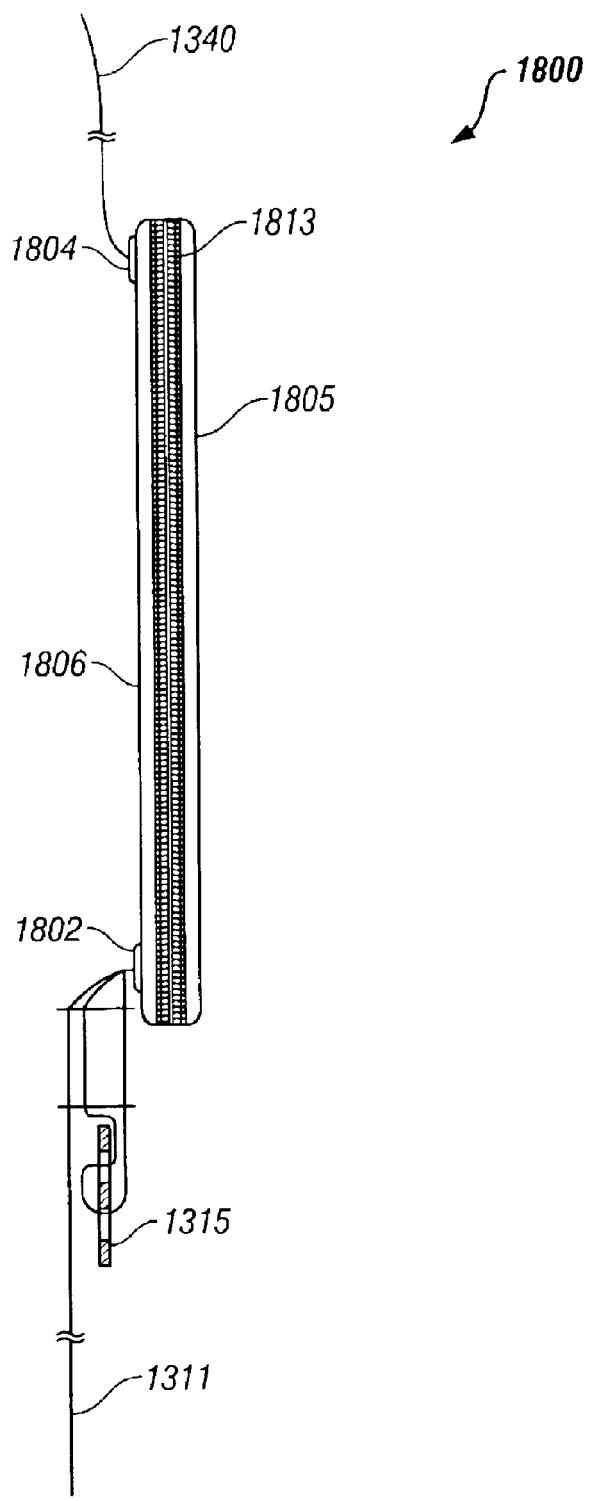
FIG. 20 shows a side view of the exemplary support collar shown in FIG. 18.
Figure 21:
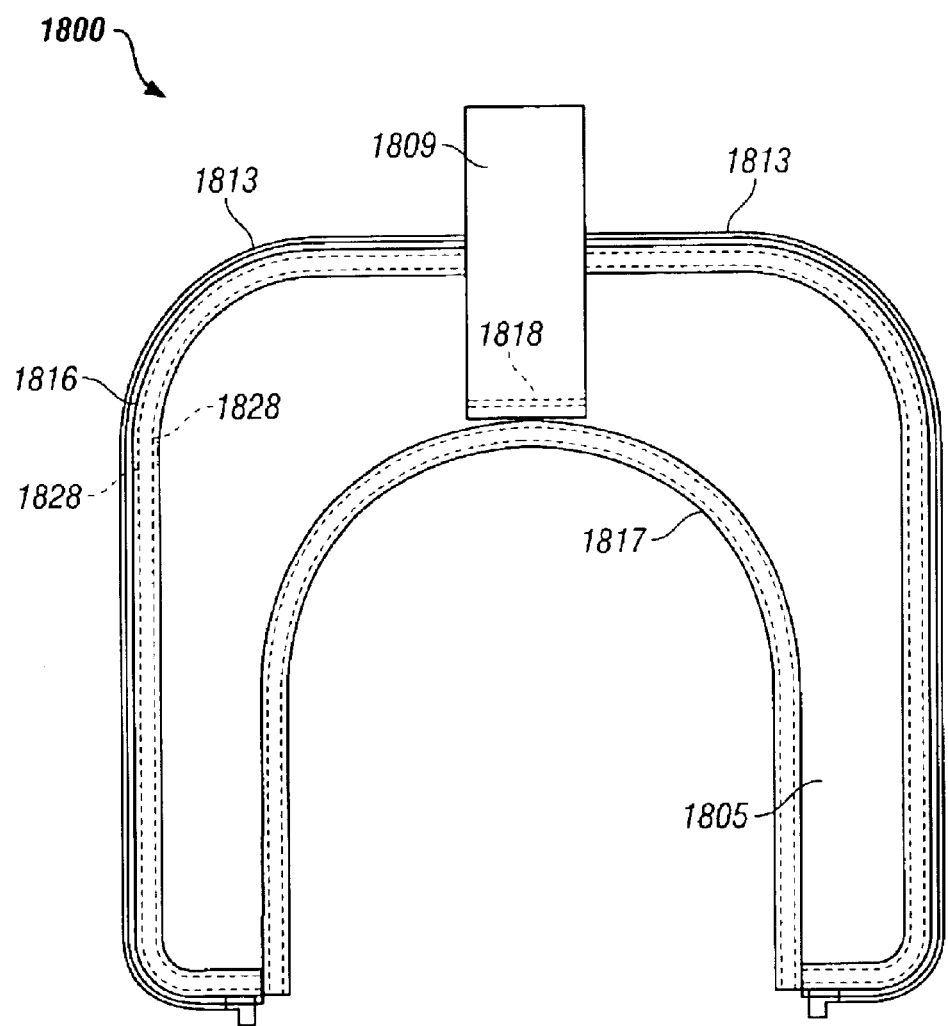
FIG. 21 shows a front view of an exemplary cover assembly of the present invention.
Figure 22:
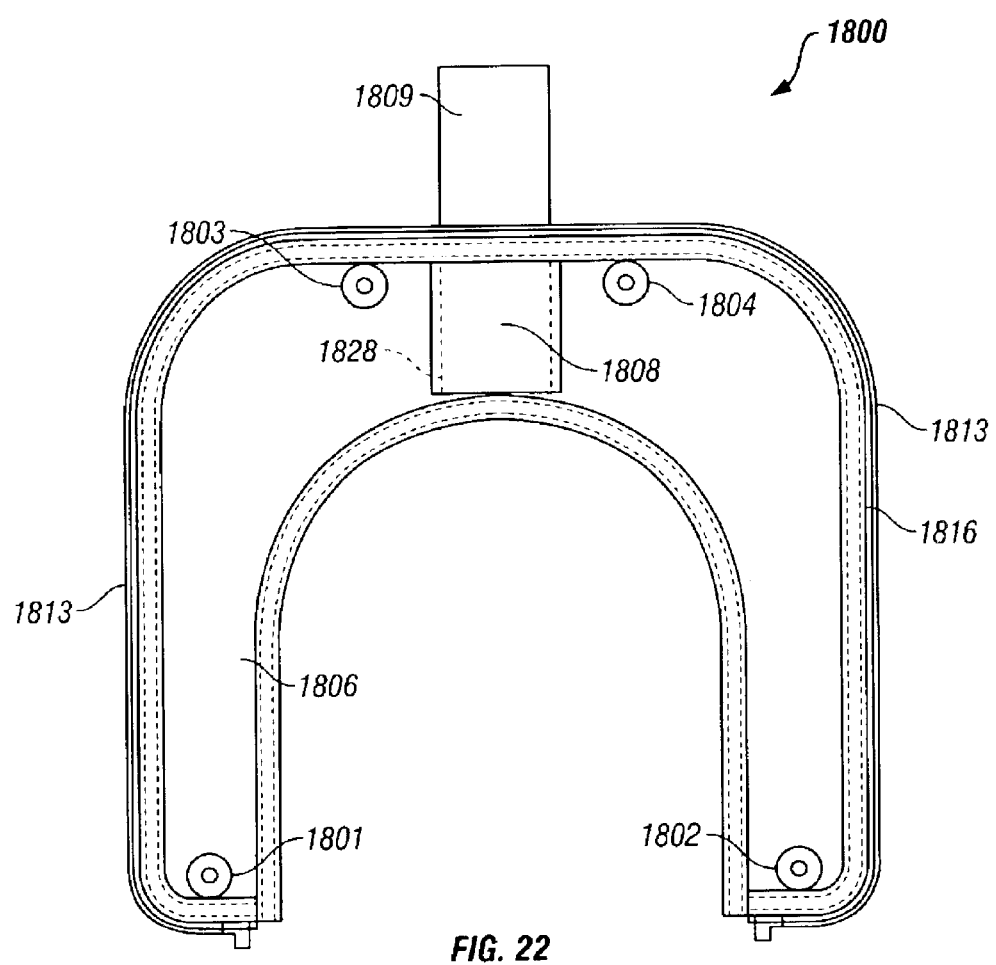
FIG. 22 shows a back view of the exemplary cover assembly shown in FIG. 21.

FIG. 11 is a flowchart showing exemplary steps that may be taken to make a support collar of the present invention. FIGS. 12 through 17 are drawings that show the details of an exemplary bladder assembly, which includes a shell, a bladder, one or more straps, and an inflator assembly. FIGS. 18 through 20 show the exemplary bladder assembly being enclosed in an exemplary cover assembly. FIGS. 21 and 22 are drawings that show the details of the exemplary cover assembly. The cover assembly includes a cover, one or more grommet sets, and a zipper.

Figure 12:
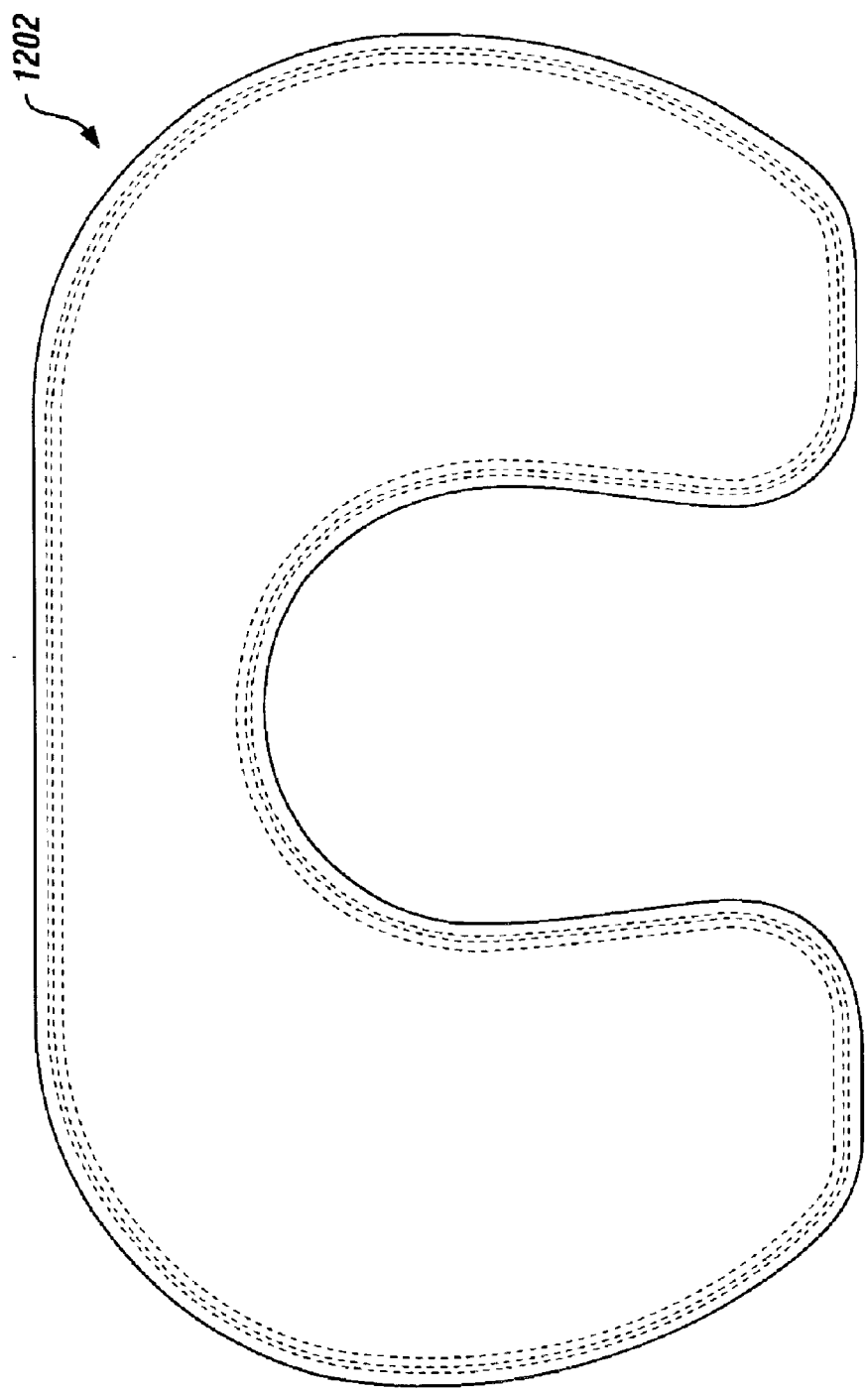
FIG. 12 shows an exemplary shape that can be used to make panels for a bladder and a shell of a preferred embodiment of the invention.

In step 1102, panels for the bladder and the shell are prepared. Two panels, a front panel and a back panel, are required for each of the bladder and the shell. Shape 1202 shown in FIG. 12 represents an exemplary shape for the bladder and shell panels. In a preferred embodiment, the bladder panels are made of a nonporous material and the shell panels are made from a porous material. For example, the nonporous material for the bladder may be a polyurethane coated or silicone-coated nylon fabric. The nonporous material for the shell may be a woven nylon or any material typically used for airbag construction.

In 1104, the bladder panels and the shell panels are attached together. As shown in FIGS. 13–16, front shell panel 1305, front bladder panel 1307, back bladder panel 1308, and back shell panel 1306 are attached to each other by seals 1318. Seals 1318 are preferably RF (radio frequency) seals. Seals 1318 are preferably one-eighth of an inch wide along the perimeters of panels 1305, 1306, 1307, and 1308. Note that bladder panels 1307 and 1308 are on the inside of shell panels 1305 and 1306. Seals 1318 provides air chamber 1304 with an airtight environment. In addition, panels 1305, 1306, 1307, and 1308 are stitched together at locations 1319 along the perimeters. Stitches at locations 1319 provide structural integrity to bladder assembly 1300. Stitches at location 1319 should not interfere with or punch through seals 1318. Preferably, stitches at locations 1319 are outside of seals 1318 as shown in FIGS. 13, 14, 15, and 16.

Figure 13:
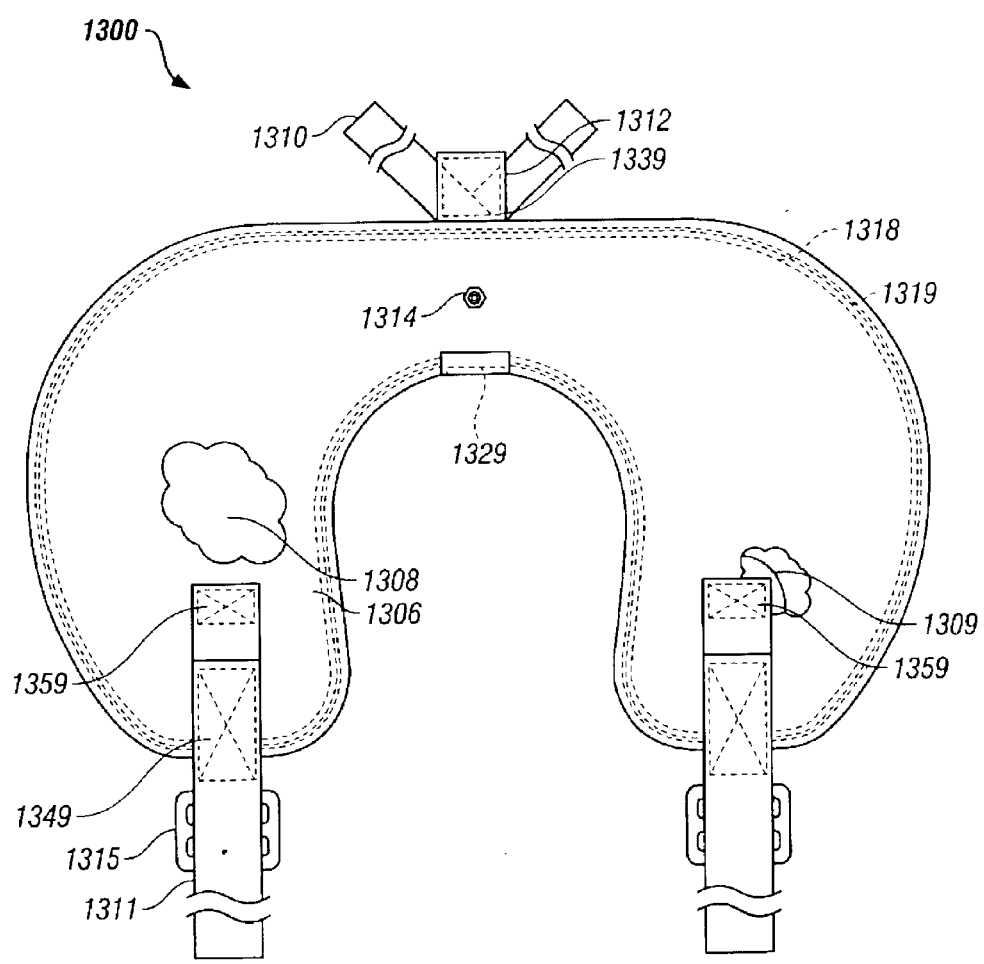
FIG. 13 shows a front view of an exemplary bladder assembly of the present invention.
Figure 14:
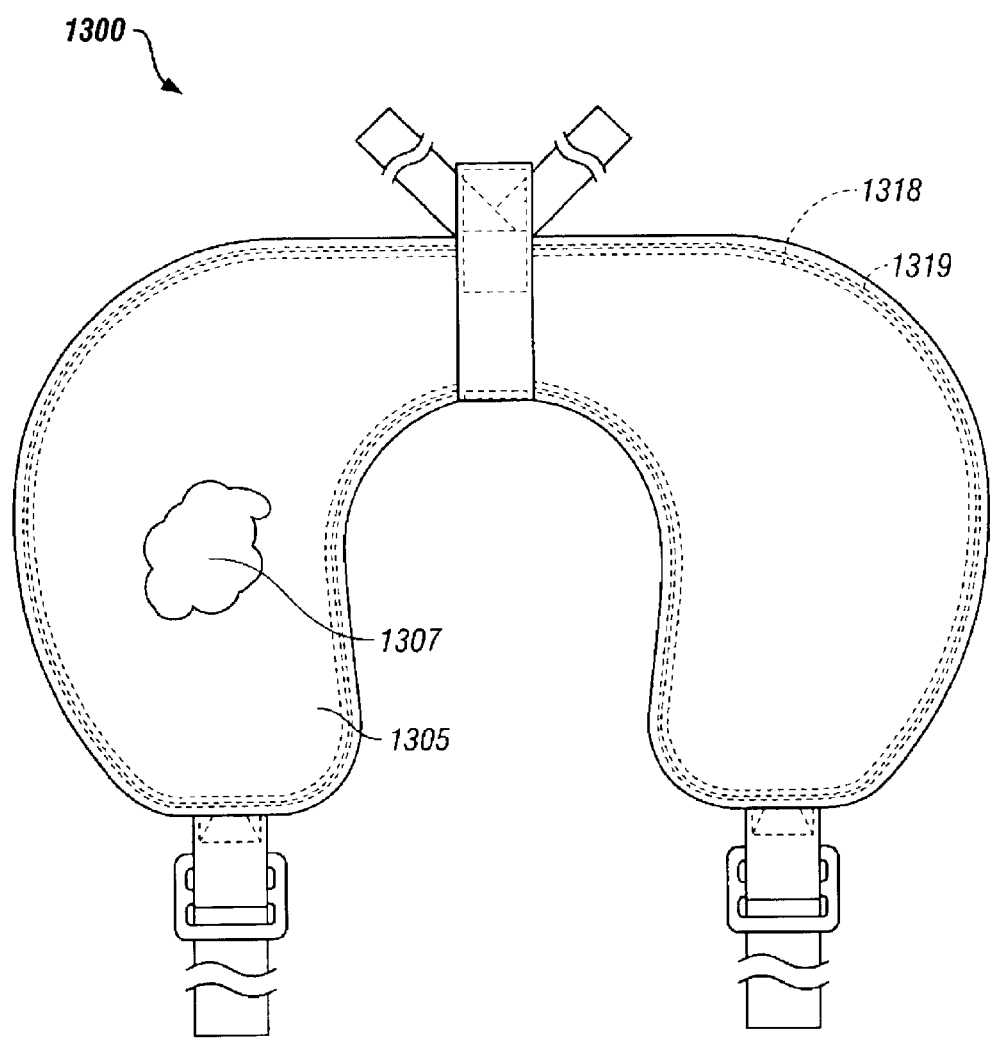
FIG. 14 shows a back view of the exemplary assembly shown in FIG. 13.
Figure 16:
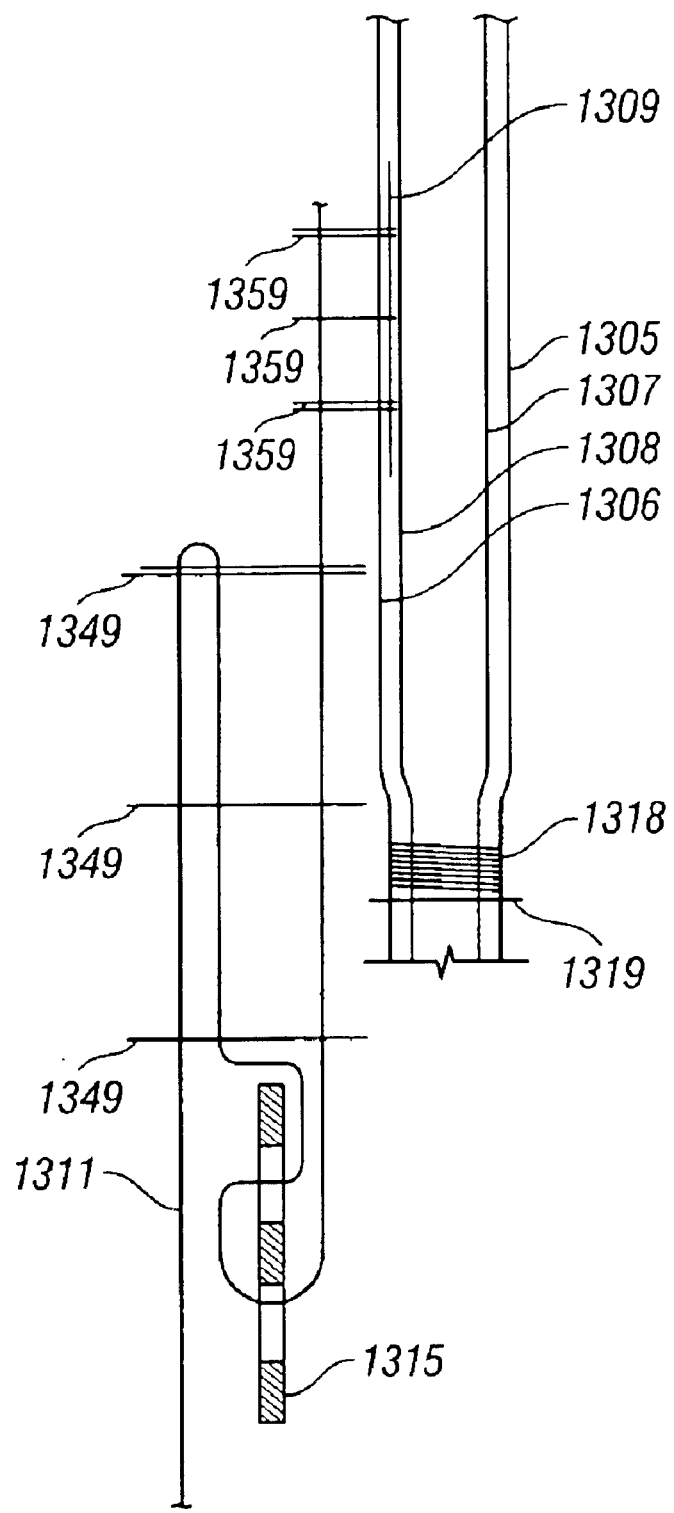
FIG. 16 shows a cross-sectional view along line B—B shown in FIG. 13.

In step 1106, one or more straps are attached to the bladder assembly. For example, as shown in FIGS. 13 and 16, back shell panel 1306 is attached to front adjustment straps 1311 at location 1359. Each of front adjustment straps 1311 is further attached using stitches at locations 1349. Preferably, front adjustment straps 1311 have quick release adapters 1315. Quick release adapters 1315 can, for example, allow each strap to be disconnected between the shell and the harness with a single motion of one hand. Quick release adapters 1315 can also be adapted so that it can be used to adjust the length of front adjustment straps 1311. Each of front adjustment straps 1311 is preferably further attached to back shell panel 1306 with reinforcement pad 1309 as shown in FIG. 16. Each of reinforced pad 1309 is preferably located between back shell panel 1306 and back bladder panel 1308 although stitches at locations 1359 do not interfere with back bladder panel 1308.

Figure 17:
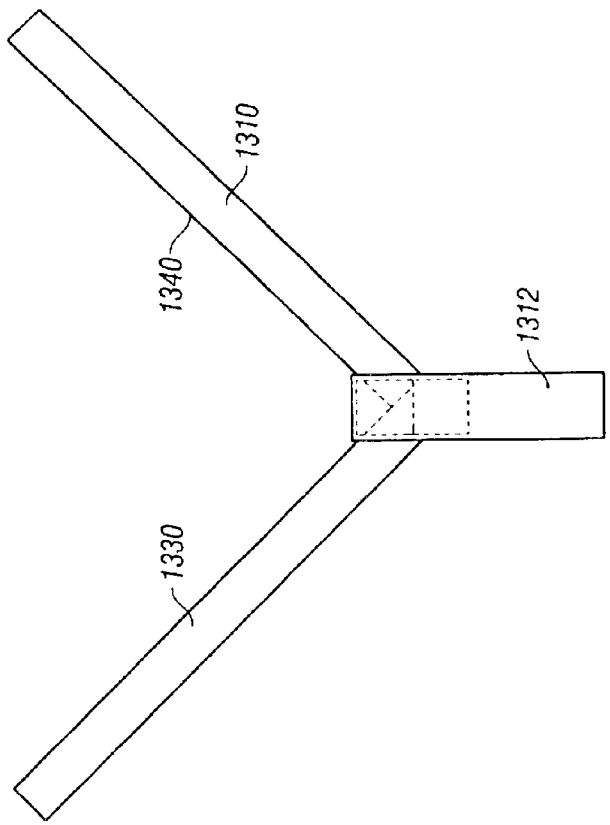
FIG. 17 shows an exemplary shape of an aft retainer strap and a top retainer strap for the exemplary assembly shown in FIG. 13.

Shell assembly 1300 further includes top retainer strap 1312. Top retainer strap 1312 is preferably stitched to panels 1305, 1306, 1307 and 1308 at location 1329. In addition, shell assembly 1300 can further include aft retainer strap 1310, which is stitched to tope retainer strap 1312 at location 1339. Aft retainer strap 1310 includes left strap 1330 and right strap 1340, as shown in FIG. 17.

Figure 15:
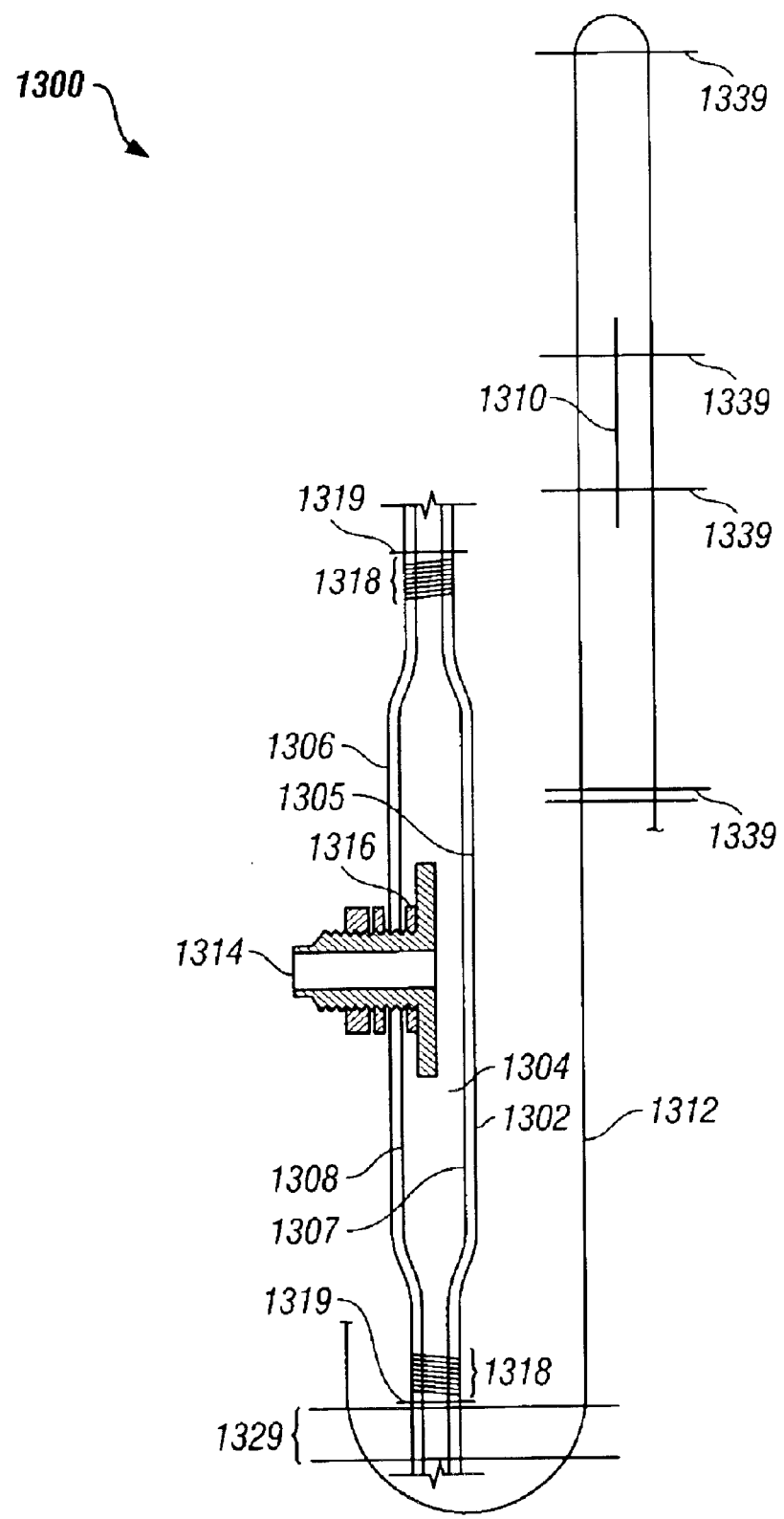
FIG. 15 shows a cross-sectional view along line A—A shown in FIG. 13.

In step 1108, the bladder assembly is equipped with an inflator assembly. For example, as shown in FIGS. 13 and 15, inflator assembly 1314 can be attached to back bladder panel 1308 through back shell panel 1306. Inflator assembly 1314 can be attached to bladder assembly 1300 at any location. The preferred location, however, is located near the back of the neck of the user on the back panels of bladder assembly 1300 as shown in FIGS. 13 and 15. This location is preferred because it does not interfere with the user and does not contact the user during operation and use of the invention. This location is close to the ejection seat and therefore less likely to be interfered with by movement of the user. In the embodiment shown, inflator assembly 1314 includes lower gasket 1316, which prevents leakage of inflation fluid from air chamber 1304. In this configuration, inflator assembly 1314 is adapted to receive inflation fluid from an outside source.

Figure 23:
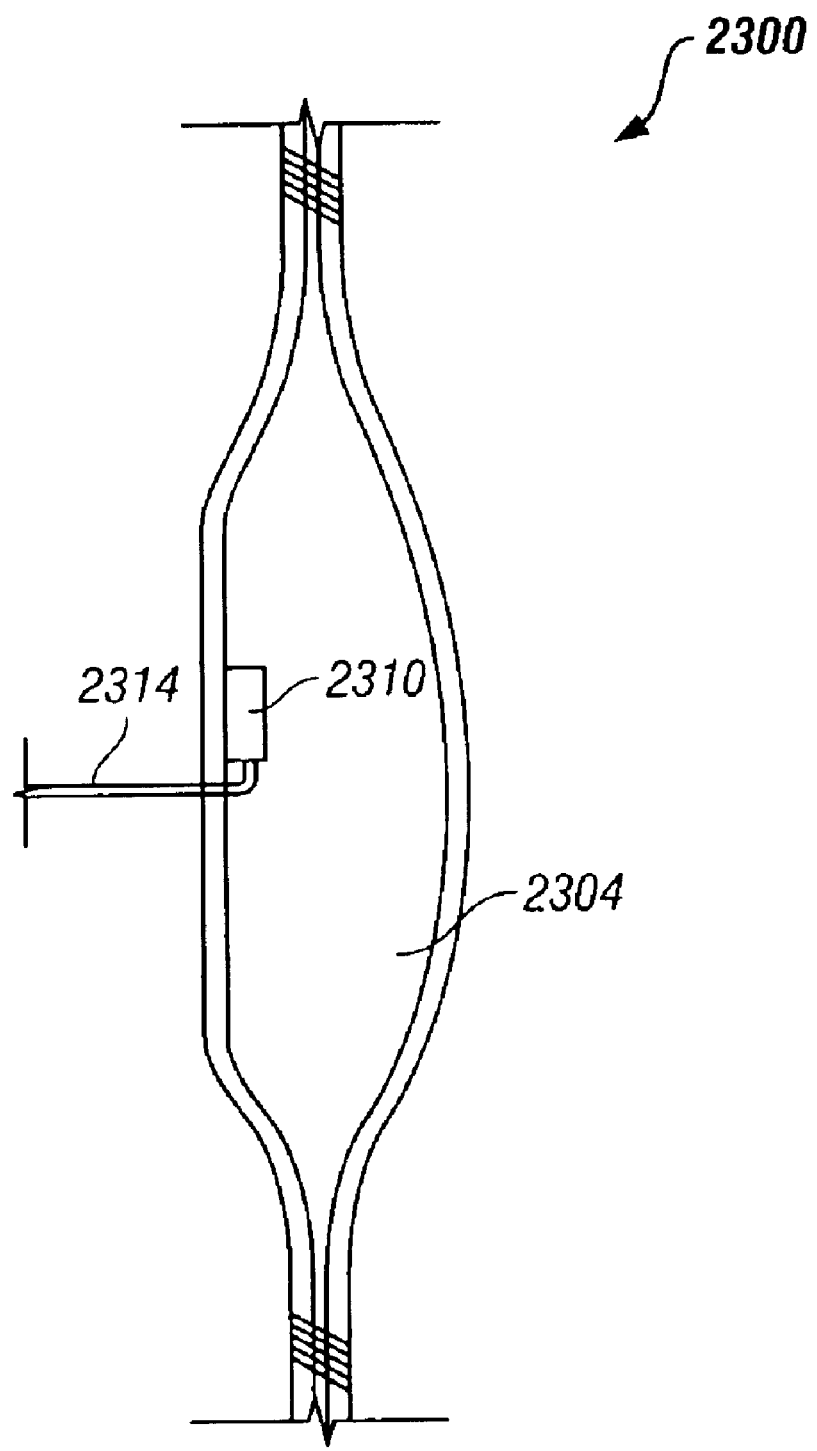
FIG. 23 shows an alternative placement of an inflator in a preferred embodiment of the present invention.

In a different embodiment shown in FIG. 23, bladder assembly 2300 includes internal inflator 2310, which is located within air chamber 2304. Internal inflator 2310 is adapted to be activated by an electrical signal received via wires 2314. This eliminates disadvantages associated with typical tube configuration. For example, the typical tube configuration tends to be cramped or collapsed thereby reducing air flow to the bladder assembly. An internal inflator allows use of electrical rather than fluid interfaces with the bladder and inflator, which are simpler, have fewer parts, and are less prone to leak. An internal inflator allows the use of electrical wires rather than fluid lines outside of and leading into the bladder. Fluid lines are inflexible and cumbersome, interfere with the user, and may become pinched or kinked, cutting off the flow of fluid when needed. Electrical lines are smaller, more rugged, and simpler for the user to connect.

In step 110, the bladder cover assembly is inserted into a cover assembly. The bladder cover assembly is preferably folded in an accordion configuration. This configuration maximizes the force that separates a zipper during inflation of the bladder assembly. As shown in FIG. 18, cover assembly 1800 houses bladder assembly 1300. Cover assembly 1800 includes zipper 1813. When disengaged or opened, zipper 1813 facilitates bladder assembly 1300 to be inserted into cover assembly 1800. The straps of the bladder assembly are then fed through the cover assembly. Cover assembly 1800 has grommet sets 1801, 1802, 1803, and 1804. As shown in FIG. 19, grommet sets 1801, 1802, 1803, and 1804 are preferably disposed on back cover panel 1806. Grommet sets 1803 and 1804 are preferably located one on each side of closing strap 1809. This allows left strap 1330 and right strap 1340 of aft retainer strap 1310 to feed through grommet sets 1803 and 1804, respectively, and be attached to a harness worn by a user. Grommet sets 1801 and 1802 are located near the open end so that front adjustment straps 1311 can be fed through to attach bladder assembly 1300 to the harness.

FIGS. 21 and 22 provides further details of cover assembly 1800. Front cover panel 1805 and back cover panel 1806 are attached to each other. The attachment can be accomplished using bindings at locations 1817. Zipper 1813 is attached to cover assembly at location 1816. Cover assembly 1800 can further include closing strap 1809, which is attached to front cover panel 1805 using stitches at locations 1818. Close straps 1809 can be attached to the harness worn by the user. In addition, cover assembly 1800 can include inflator protector 1808, which is stitched to back cover panel 1806 to protect inflator assembly 1314.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An inflatable support collar comprising:
   a bladder configured to be inflated by a fluid to form an air chamber;
   a shell enclosing the bladder, wherein the shell is configured to be attached to a harness;
   a strap attaching the shell to the harness; and
   a cover configured to surround the shell during a normal condition and to separate from the shell during an inflated condition, wherein the cover includes a grommet set through which the strap is fed.

2. The support collar of claim 1, wherein at least one of the bladder and the shell is made of a nonporous material.

3. The support collar of claim 1, wherein at least one of the bladder and the shell is made of a porous material.

4. The support collar of claim 1, wherein the bladder is made of a nonporous material and the shell is made of a porous material.

5. An inflatable support collar comprising:
   a bladder configured to be inflated by a fluid to form an air chamber;
   a shell enclosing the bladder, the shell is configured to be attached to a harness by a strap, wherein the shell is configured to shape the air chamber into two lobes, wherein each of the two lobes are characterized by a close end and an open end; and
   a cover configured to enclose the shell during a normal condition and to separate from the shell during an inflated condition, wherein the cover includes a grommet set through which the strap is fed.

6. The support collar of claim 5, further comprising a device configured to hold the open ends together.

7. The support collar of claim 5, wherein each of the two lobes is characterized by a cross-section.

8. The support collar of claim 7, wherein the cross-section takes the shape of one of a circle and an ellipse.

9. The support collar of claim 7, wherein the cross-section is characterized by a length dimension through a center of gravity of the cross-section.

10. The support collar of claim 9, wherein the length dimension varies from the open end to the close end.

11. The support collar of claim 9, wherein the length dimension decreases from the open end to the close end.

12. A flotation device comprising:
    a harness configured to be worn by a user;
    a flotation member attached to the harness, wherein the flotation member comprises a neck area;
    a bladder, wherein the bladder is configured to be inflated by a fluid to form an air chamber around the neck area; and
    a shell enclosing the bladder, wherein the shell is configured to be attached to the harness, and
    a cover assembly that encloses the shell during a normal condition, wherein the cover assembly includes a grommet set.

13. The flotation device of claim 12, wherein the cover assembly includes a zipper.

14. The flotation device of claim 12, further comprising a strap that attaches the shell to the harness through the grommet set.

15. A method for making a support collar comprising:
    preparing panels for a bladder and a shell;
    attaching the panels to form a bladder assembly;
    adding a strap to the shell of the bladder assembly, wherein the strap is configured to be attached to a harness; and
    inserting the bladder assembly into a cover assembly, wherein the cover assembly includes a grommet set.

16. The method of claim 15, wherein the panels include a front bladder panel, a back bladder panel, a front shell panel, and a back shell panel.

17. The method of claim 16, further comprising attaching the strap to one of the front shell panel and the back shell panel.

18. The method of claim 15, further comprising sealing the panels.

19. The method of claim 18, wherein the sealing-involves an RF seal.

20. The method of claim 15, further comprising stitching the panels.

21. The method of claim 15, further comprising feeding the strap through the grommet set.

22. A method for making a floatation device having a floatation member and a harness comprising:
preparing a bladder assembly, wherein the bladder assembly comprises a bladder and a shell;
adding a strap to the shell of the bladder assembly, wherein the strap is configured to be attached to a harness;
inserting the strap through a grommet set of a cover assembly; and
attaching the shell to the harness near a neck area of the floatation member.

23. The method of claim 22, wherein the shell comprises a front panel and a back panel.

24. The method of claim 23, further comprising attaching the bladder assembly to the harness at one of the front panel and the back panel.

25. The method of claim 22, wherein the bladder assembly is configured to be inflated by an inflator located within an air chamber of the bladder assembly.

26. An inflatable support collar comprising:
a bladder assembly comprising a bladder in a shell, wherein the shell is configured with a strap to be attached to a harness; and
a cover assembly that encloses the bladder assembly, wherein the cover assembly has one or more grommet sets through which the strap is fed to enable the shell to be attached to the harness.

27. The support collar of claim 26, wherein the bladder assembly comprises a bladder, a shell, and one or more straps.

28. The support collar of claim 27, wherein the one or more straps are attached to the shell.

29. The support collar of claim 27, wherein the one or more straps are attached to the harness through the grommet sets.

30. The support collar of claim 26, wherein the bladder assembly comprises an inflator assembly.

31. The support collar of claim 30, wherein the inflator assembly includes an inflator and an electrical connection, wherein the inflator is located with the bladder and the electrical connection is configured to receive an electrical signal to activate the inflator.

32. A floatation device comprising:
a bladder having a front bladder panel and a back bladder panel;
a shell enclosing the bladder, wherein the shell has a front shell panel adjacent to the front bladder panel and a back shell panel adjacent to the back bladder panel;
one or more straps each having a shell end and a harness end, wherein the shell end is attached to one of the front shell panel and the back shell panel, wherein the harness end is attached to a harness and
a cover for enclosing the shell and the bladder, wherein the cover includes a grommet set.

33. The floatation device of claim 32, wherein the shell is configured to restrict an expansion of the bladder during an inflated condition.

34. The floatation device of claim 33, wherein the bladder assembly creates an air chamber between the front bladder panel and the rear bladder panel during the inflated condition, wherein the air chamber comprises a left lobe and a right lobe, each characterized by a cross-section.

35. The floatation device of claim 34, wherein the cross-section has a varying dimension.

36. The floatation device of claim 35, wherein the varying dimension increases from a close end of each of the left lobe and the right lobe to an open end of the each of the left lobe and the right lobe.

37. A floatation device comprising:
a bladder configured to form an air chamber during an inflated condition;
an inflator located within the bladder, wherein the inflator is configured to be activated by an electrical signal;
a shell enclosing the bladder, wherein the shell is configured to be attached to a harness; and
a cover for enclosing the shell and the bladder, wherein the cover includes one or more grommet sets.

38. The floatation device of claim 37, further comprising one or more straps configured to secure the shell to the harness through the one or more grommet sets.

* * * * *